United States Patent
Kashiwai et al.

(10) Patent No.: US 8,365,856 B2
(45) Date of Patent: Feb. 5, 2013

(54) SHIFTING SYSTEM FOR A MOTORCYCLE, AND MOTORCYCLE INCORPORATING SAME

(75) Inventors: Mikio Kashiwai, Saitama (JP); Kanau Iwashita, Saitama (JP); Yoshihisa Ieda, Saitama (JP); Hisashi Matsuo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 995 days.

(21) Appl. No.: 12/381,779

(22) Filed: Mar. 17, 2009

(65) Prior Publication Data
US 2009/0249914 A1 Oct. 8, 2009

(30) Foreign Application Priority Data
Apr. 3, 2008 (JP) .................. 2008-097472

(51) Int. Cl.
B62M 25/02 (2006.01)
B60K 20/00 (2006.01)

(52) U.S. Cl. ..................... 180/230; 74/473.15

(58) Field of Classification Search ............. 74/501.5 R, 74/500.5, 502, 502.2, 502.3, 502.4, 502.5, 74/502.6, 473.15, 473.16, 473.26, 473.28, 74/479.29, 503; 267/70, 116, 139; 180/230
See application file for complete search history.

(56) References Cited

U.S. PATENT DOCUMENTS

| | | | | |
|---|---|---|---|---|
| 3,546,962 A | * | 12/1970 | Ruhala | 74/502.4 |
| 3,572,159 A | * | 3/1971 | Tschanz | 74/502.5 |
| 4,592,249 A | * | 6/1986 | Lehmann et al. | 74/473.1 |
| 6,220,109 B1 | | 4/2001 | Fischer et al. | |
| 6,374,691 B1 | | 4/2002 | Grundberg et al. | |
| 7,513,849 B2 | * | 4/2009 | Minami | 477/78 |
| 7,866,229 B2 | * | 1/2011 | Casalini et al. | 74/501.5 R |
| 8,079,286 B2 | * | 12/2011 | Nagle et al. | 74/502.6 |
| 8,127,640 B2 | * | 3/2012 | Steuer et al. | 74/502.6 |
| 2003/0192393 A1 | * | 10/2003 | Matsuo | 74/502.6 |
| 2007/0284849 A1 | * | 12/2007 | Kosugi et al. | 280/288.4 |

FOREIGN PATENT DOCUMENTS

| | | | |
|---|---|---|---|
| EP | 1 826 442 A1 | | 8/2007 |
| JP | 1-116240 | | 8/1989 |
| JP | 05-039865 | | 2/1993 |
| JP | 05071618 A | * | 3/1993 |
| JP | 2001004024 A | * | 1/2001 |
| JP | 2006275293 A | * | 10/2006 |
| JP | 2010008393 A | * | 1/2010 |
| JP | 2011196800 A | * | 10/2011 |

* cited by examiner

Primary Examiner — Ruth Ilan
Assistant Examiner — Daniel Yeagley
(74) Attorney, Agent, or Firm — Carrier Blackman & Associates, P.C.; William D. Blackman; Joseph P. Carrier

(57) ABSTRACT

A shifting system for a motorcycle includes a shift link mechanism for transmitting operational force during a gear shifting operation. The shift link mechanism is arranged between a shift spindle and a change pedal operated by a shifting movement. A motion capture mechanism is provided on the shift link mechanism so as to transmit the operational force from the change pedal to the shift spindle via an resilient member including a compressive coil spring.

16 Claims, 7 Drawing Sheets

SHIFTING SYSTEM FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2008-097472, filed on Apr. 3, 2008. The entire subject matter of this priority document, including specification claims and drawings, is incorporated by reference herein.

BACKGROUND OF THE INVENTION

1. Field of the Invention

The present invention relates to a shifting system for a motorcycle, and to a motorcycle incorporating the same. More particularly, the present invention relates to a shifting system having a shift link mechanism disposed between a shift spindle and a shift operation unit, and a motion capture mechanism disposed on the shift link mechanism, and to a motorcycle incorporating the same.

2. Description of the Background Art

There is a known shifting system for a motorcycle, which executes a gear shift by turning a shift drum in response to an operator operating a change pedal or by a shift actuator to axially move a shifting gear via a shift fork to allow the projection and recess of a dog clutch provided in the lateral surfaces of the shifting gears to be engaged to each other.

The known shifting system, as discussed above, may sometimes cause so-called dog-abutment, in which the projection of the dog clutch strikes against a portion other than a recess before being fitted thereinto. The occurrence of such dog-abutment may affect the operational feeling of the change pedal.

The Japanese Utility Model Laid-open No. Hei 1-116240 and the Japanese Patent Laid-open No. Hei 5-39865 disclose improving such an operational feeling of the change pedal.

According to the Japanese Utility Model Laid-open No. Hei 1-116240 (as shown in FIGS. 1 to 4 thereof), a motion capture mechanism provided with a pressurizing spring 10 includes a torsion coil spring installed on a shift shaft 5 turned by operation of a pedal 7. This can move the pedal 7 even at the time of dog-abutment. When the projection of the dog clutch is aligned with the recess, the projection of the dog clutch is fitted to the recess by the elastic force of the pressurizing spring 10.

According to the Japanese Patent Laid-open No. Hei 5-39865, shifting operation is executed by a shift actuator. As shown in FIG. 5 of the Japanese Patent Laid-open No. Hei 5-39865, a motion capture mechanism 67 for transmitting the drive force of an electric motor 54 as a shift actuator to a shift drum 48 via a coil spring 70 is provided to reduce a load on the electric motor 54 at the time of dog-abutment.

In the systems as disclosed in the Japanese Utility Model Laid-open No. Hei 1-116240 and the Japanese Patent Laid-open No. Hei 5-39865, the provision of the motion capture mechanism increases a number components required for assembling shifting system, such as the torsion coil spring and the like located around the shift drum, which may probably increase man-hours required for assembling the shifting system. Further, in the system disclosed in the Japanese Utility Model Laid-open No. Hei 1-116240 and the Japanese Patent Laid-open No. Hei 5-39865, it is difficult to allow the shifting system to have general versatility for vehicles not provided with the motion capture mechanism.

The present invention has been made to overcome such drawbacks of existing shifting system. Accordingly, it is one of the objects of the present invention to provide a shifting system that can reduce number of man-hour required for assembling the shifting system, and which can be made versatile in relation to assembly thereof while providing satisfactory operational feeling of a gear shifting operation member during shifting of the gears.

SUMMARY OF THE INVENTION

In order to achieve the above objects, the present invention according to a first aspect thereof is characterized in that in a shifting system in which a shift spindle is turned to allow a shift drum interlocked with the turning of the shift spindle to selectively establish meshing engagement of a predetermined gear of gears for a plurality of gear steps via a shift fork, by including a transmission mechanism provided between shift operation unit operated by a shifting instruction and the shift spindle so as to transmit operational force of shift operation; and a motion capture mechanism provided on the transmission mechanism for transmitting the operational force via an resilient member.

During operation of the shifting system, when the shift operation unit is operated by the shifting movement, the operational force of the shift operation is transmitted to the shift spindle via the motion capture mechanism on the transmission mechanism to turn it. The shift drum is interlocked with the turning of the shift spindle for establishing the meshing engagement of the predetermined gear via the shift fork for shifting.

In this case, a projection of a dog clutch provided on one of the gears including a predetermined gear may not be meshed with a recess of the other gear but may be struck against a portion other than the recess. Even in such a case, along with the operation of the shift operation unit, the motion capture mechanism loses the shift operation. Therefore, the shift operation can be done without a sensory feeling of a discomfort.

According to the present invention, the motion capture mechanism is provided on the transmission mechanism between the shift spindle and the shift operation unit. Therefore, it is not necessary to especially add one or more components to the periphery of the shift drum of the shifting system. In addition, the motion capture mechanism can easily be mounted to and dismounted from the transmission mechanism.

Thus, even in the types of vehicles in which the shifting system is not provided with the motion capture mechanism but the transmission mechanism is provided between the shift spindle and the gear shift operating member, the motion capture mechanism can easily be assembled with the transmission mechanism.

The present invention according to a second aspect thereof is characterized in that the transmission mechanism is a link mechanism. The link mechanism includes a linearly movable member which moves linearly, and the motion capture mechanism is provided in the linearly movable member.

During operation of the shifting system, since the motion capture mechanism is provided in the linearly movable member of the transmission mechanism, it can be assembled to the transmission mechanism only by connecting both the ends of the motion capture mechanism with the transmission mechanism.

The present invention according to a third aspect thereof is characterized in that the shift operation unit is a change pedal operated by an operator of the motorcycle.

During operation of the shifting system, the operational feeling of the change pedal can be improved by the motion capture mechanism.

The present invention according to a fourth aspect thereof is characterized in that the resilient member is operated in a compressive direction thereof during upshifting and downshifting operations.

During operation of the shifting system, since the resilient member is structured to operate in the compressive direction, during upshifting and downshifting gear operations, it is not necessary to secure to the resilient member an additional member for transmitting the operational force to the resilient member and another additional member for receiving the operational force from the resilient member.

The present invention according to a fifth aspect thereof is characterized in that the motion capture mechanism is provided with a stroke detection unit for detecting an amount of motion received by the motion capture mechanism during operation thereof.

During operation of the shifting system, since the stroke detection unit detects the amount of motion (stroke) received by the motion capture mechanism, the stroke is easily detected.

The present invention according to a sixth aspect is characterized in that the motion capture mechanism includes: a case linked at one end to a transmission mechanism with one of the shift operation unit and the shift spindle; a pull rod having one end inserted into the case; a spring-receiving member movably inserted into the case and restricted by the other end side of the case to be displaced; an resilient member disposed between one end of the pull rod and the spring-receiving member; and a push-pull rod attached to the other end of the pull rod so as to be axially movable in a predetermined range and to be able to push the spring-receiving member, and linked to the transmission mechanism with the other of the gear shift operation member and the shift spindle.

During operation of the shifting system, for example, when the gear is upshifted, the push-pull rod is pushed-in toward the case to enable the compression of the resilient member via the spring-receiving member while the case is brought into the stationary state. When the gear is downshifted, the pull rod is pulled out from the side of the case via the push-pull rod. Thus, it is possible for one end of the pull rod to compress the resilient member when the case is brought into the stationary state.

The present invention according to a seventh aspect thereof is characterized in that the stroke detection unit is a stroke sensor. A computing unit for computing a shift operation load based on a value detected by the stroke sensor is provided in the shifting system.

During operation of the shifting system, the stroke sensor detects a stroke amount and the computing unit computes a stroke based on the detection value of the stroke amount. Since the shift load can be determined using the partial function of the motion capture mechanism, it is not necessary to additionally provide a load sensor.

The present invention according to an eighth aspect thereof is characterized in that the shifting system according to one of the first through seventh aspects is provided for a motorcycle.

During operation of the shifting system, the provision of the motion capture mechanism improves the operational feeling encountered when the operator mounting on the motorcycle executes the shift operation. In addition, the motion capture mechanism can easily be mounted to the motorcycle from the outside of the shifting system.

EFFECTS OF THE INVENTION

According to the first aspect of the present invention, the transmission mechanism for transmitting the operational force of shift operation is arranged between the shift operation unit operated by a shifting instruction and the shift spindle. In addition, the motion capture mechanism is provided on the transmission mechanism so as to transmit the operational force via the resilient member.

When the shift operation unit is operated in response to the shifting movement, the operational force of the shift operation is transmitted to the shift spindle via the motion capture mechanism on the transmission mechanism to turn it. The shift drum is interlocked with the turning of the shift spindle to establish the meshing engagement of the predetermined gear via the shift fork for shifting the gear.

In this case, the projection of a dog clutch provided on one of the gears constituting the predetermined gear may not be meshed with the recess of the other gear but may be struck against a portion other than the recess. Even in such a case, along with the operation of the shift operation unit, the motion capture mechanism loses the shift operation.

Therefore, the shift operation can be done without a sense of discomfort. When such a dog-abutment is eliminated, the meshing engagement of the gear can reliably be established by the biasing force stored by the resilient member.

Thus, the shifting can reliably be done while the motion capture mechanism improves the operational feeling during shifting.

Since the motion capture mechanism is provided on the transmission mechanism between the shift spindle and the shift operation unit, it is not necessary to especially add one or more components to the periphery of the shift drum of the shifting system. In addition, the motion capture mechanism can easily be mounted to and dismounted from the transmission mechanism.

Thus, even in the types of vehicles in which the shifting system is not provided with the motion capture mechanism but the transmission mechanism is provided between the shift spindle and the shift operation unit, the motion capture mechanism can easily be assembled to the transmission mechanism.

With the configuration as above, the number of man-hours required for assembling of the shifting system can be reduced without an influence on the design of the peripheries of the shift drum. In addition, the motion capture mechanism can easily be assembled on a vehicle of type not originally provided with the motion capture mechanism. In other words, the general versatility of the motion capture mechanism can be enhanced.

According to the second aspect of the present invention, the transmission mechanism is a link mechanism, and the link mechanism includes a linearly movable member which moves linearly, and the motion capture mechanism is provided in the linearly movable member.

Therefore, the motion capture mechanism can be assembled to the transmission mechanism only by connecting both the ends of the motion capture mechanism with the transmission mechanism. Specifically, the motion capture mechanism can easily be assembled with the linearly movable member.

According to the third aspect of the present invention, since the shift operation unit is a change pedal operated by an operator, the operational feeling of the change pedal can be improved by the motion capture mechanism.

According to the fourth aspect of the present invention, since the resilient member is operated in a compressive direction during upshifting and downshifting operation, it is not necessary to secure to the resilient member a member for transmitting and receiving the operational force to and from the resilient member. Thus, since a complicated structure becomes unnecessary, the motion capture mechanism can be reduced in size and which requires reduced number of components.

According to the fifth aspect of the present invention, since the motion capture mechanism is provided with the stroke detection unit for detecting an amount of motion received by the motion capture mechanism during operation of the motion capture mechanism, the stroke received by the motion capture mechanism can easily be detected by the stroke detection unit.

According to the sixth aspect of the present invention, the motion capture mechanism is configured to include the case linked at one end to a transmission mechanism with one of the shift operation unit and the shift spindle; the pull rod having one end inserted into the case; the spring-receiving member movably inserted into the case and restricted by the other end side of the case to be displaced; the resilient member disposed between one end of the pull rod and the spring-receiving member; and the push-pull rod attached to the other end of the pull rod so as to be axially movable in a predetermined range and to be able to push the spring-receiving member, and linked to the transmission mechanism with the other of the gear shift operation member and the shift spindle.

For example, when the gear is upshifted, the push-pull rod is pushed into toward the case to enable the compression of the resilient member via the spring-receiving member while the case is brought into the stationary state. When the gear is downshifted, the pull rod is pulled out from the side of the case via the push-pull rod.

Thus, it is possible for one end of the pull rod to compress the resilient member when the case is brought into the stationary state. Accordingly, the motion capture mechanism can be configured with a simple structure, which can reduce the costs of the shifting system.

According to the seventh aspect of the present invention, the stroke detection unit is a stroke sensor, and the computing unit for computing a shift operation load based on a value detected by the stroke sensor is provided in the shifting system. The stroke sensor detects a stroke amount and the computing unit computes a stroke based on the detection value of the stroke amount. Since the shift load can be determined using the partial function of the motion capture mechanism, it is not necessary to additionally provide a load sensor, which may reduce cost of the shifting system.

According to the eighth aspect of the present invention, since the motorcycle is provided with the shifting system, the provision of the motion capture mechanism can improve the operational feeling encountered when the operator during operation of the motorcycle executes shift operation.

The motion capture mechanism can easily be mounted from the outside of the shifting system even to the motorcycle in which the shifting system is not provided with the motion capture mechanism. Thus, the general versatility of the motion capture mechanism can be enhanced. In addition, man-hours required for assembling of the shifting system of the motorcycle can be reduced when the motion capture mechanism is provided therefor.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
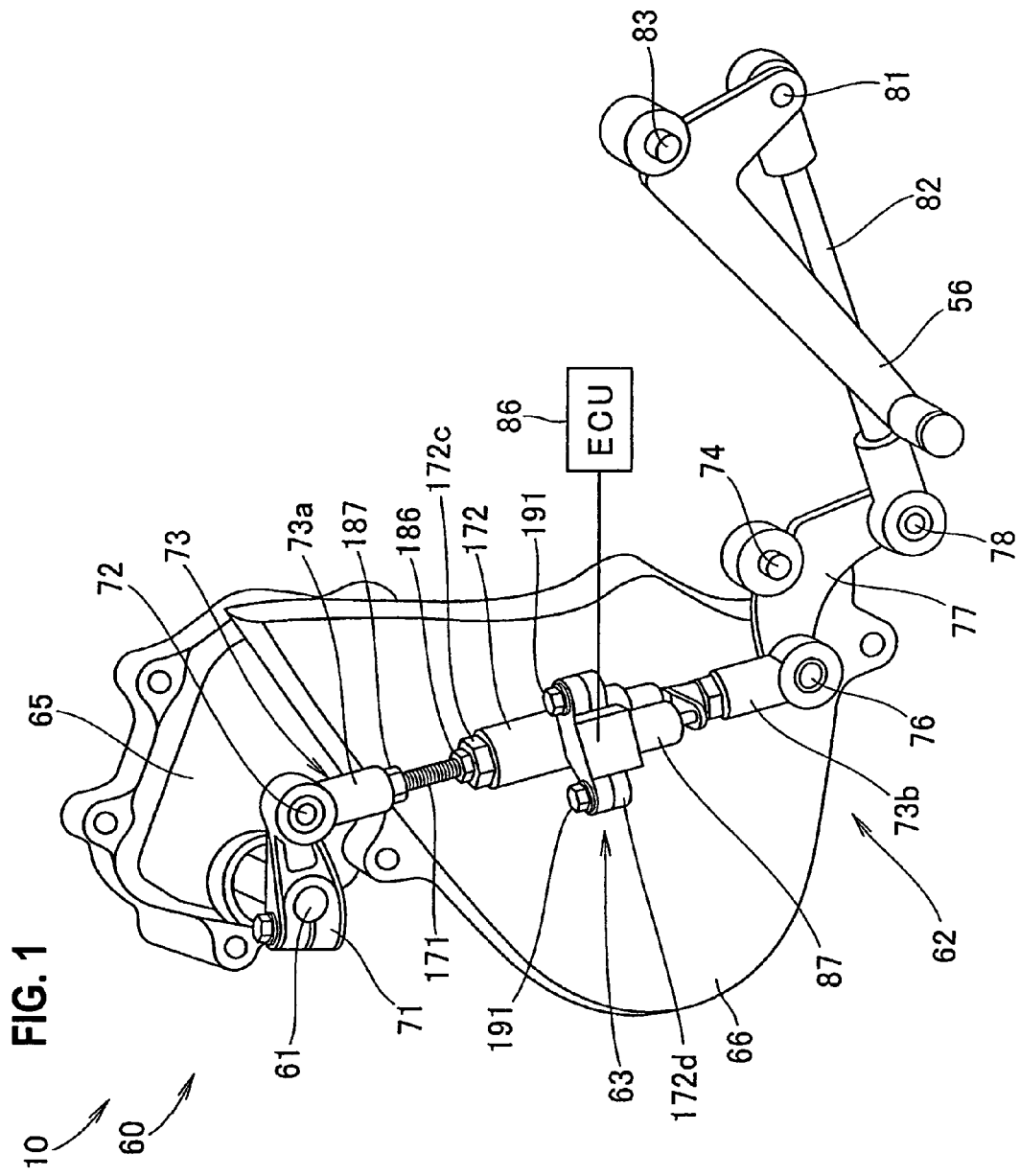
FIG. 1 is a perspective view illustrating an essential portion of a shifting system according to the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

The illustrative embodiments for carrying out the present invention are described hereinafter with reference to the accompanying drawings. It may be noted that the drawings shall be viewed based on the direction of reference numerals.

Figure 7:
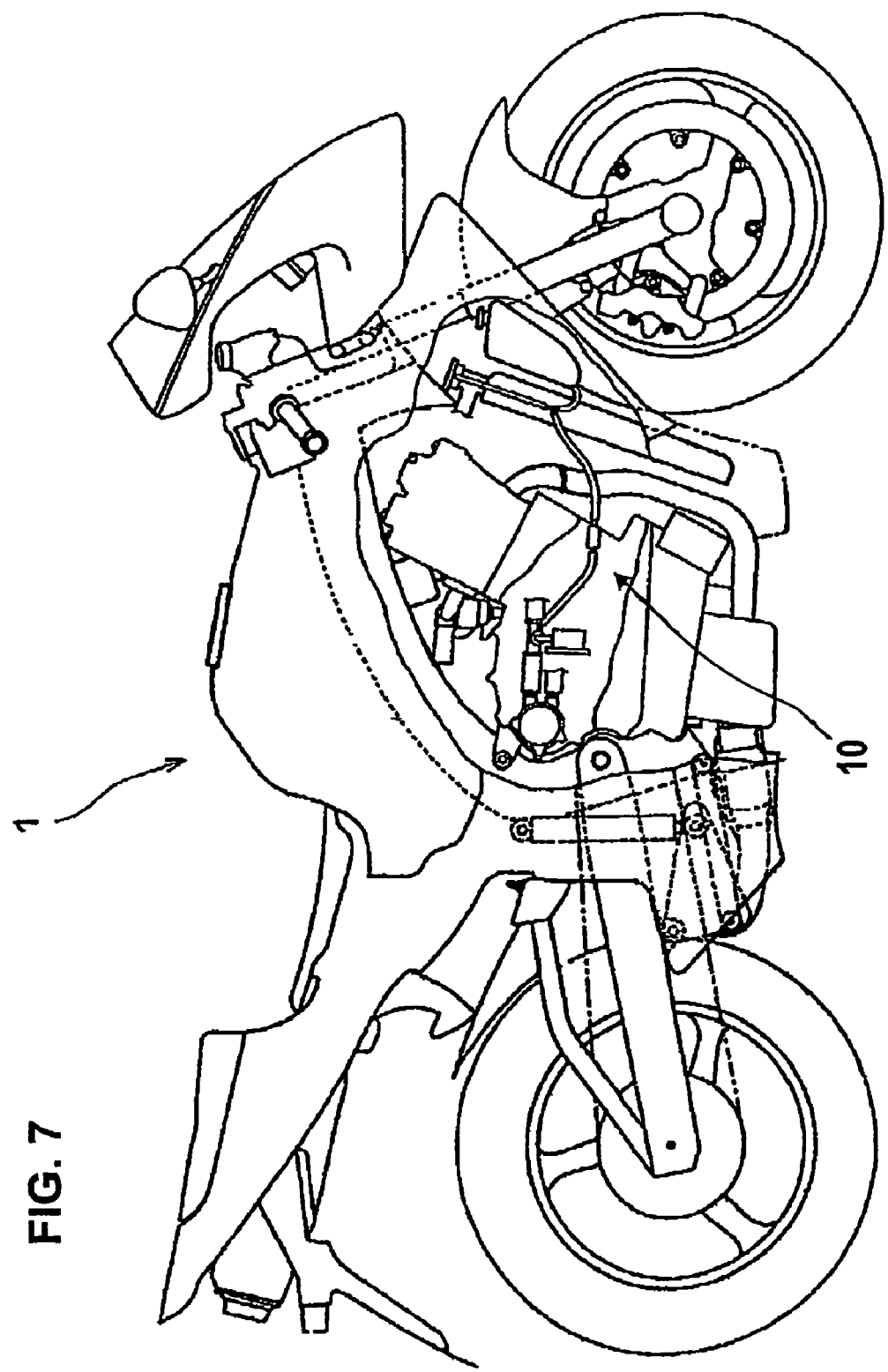
FIG. 7 is a motorcycle having the shifting system according to the present invention.

FIG. 1 is a perspective view illustrating an essential portion of a shifting system 10 for motorcycle according to the present invention. FIG. 7 shows a motorcycle 1 incorporating the shifting system 10. The shifting system 10 is provided integrally with the rear portion of an engine mounted on the motorcycle 1. The shifting system 10 includes an external shift mechanism 60 disposed on an external lateral surface of a crankcase of the engine.

The external shift mechanism 60 includes a shift link mechanism 62, a change pedal 56 and a motion capture mechanism 63. The shift link mechanism 62 mounted to a leading end of a shift spindle 61 laterally projecting from a left lateral surface of a crankcase. The change pedal 56 is connected to an end portion of the shift link mechanism 62.

The motion capture mechanism 63 is provided in the middle of the shift link mechanism 62 to improve an operational feeling of the change pedal 56. A spindle cover 65 which covers the periphery of a projecting portion of the shift spindle 61 from the crankcase. A sprocket cover 66 covers a drive sprocket attached to an output shaft of the shifting system 10 and a portion of a chain wound around the drive sprocket.

The shift link mechanism 62 includes a shift arm 71, a linear upper link 73, a support shaft 74 attached to the crankcase, an intermediate arm 77, a linear lower link 82, and a support shaft 83. The shift arm 71 is attached to an end portion of the shift spindle 61. The upper link 73 is linked to the shift arm 71 via a connection pin 72 and mounted with the motion capture mechanism 63 in the middle thereof.

The intermediate arm 77 is turnably attached to the support shaft 74 and linked at one end to the other end of the upper link 73 via a connection pin 76. The lower link 82 is linked at one end to the other end of the intermediate arm 77 via the connection pin 78 and at the other end to the change pedal 56 via a connection pin 81. The support shaft 83 attached to the crankcase to turnably support the change pedal 56.

The upper link 73 includes an upper connection link 73a linked to the upper portion of the motion capture mechanism 63 and a lower connection link 73b linked to the lower portion of the motion capture mechanism 63.

An ECU 86, as a control section, is adapted to receive a signal from a stroke sensor 87 attached to the motion capture mechanism 63. In addition, the ECU 86 computes a shift operation load based on a value as a stroke amount detected by the stroke sensor 87.

The ECU 86 includes computing unit. The computing unit computes, upon receipt of a stroke signal from the stroke sensor 87, a load (a shift operation load) produced when a compressive coil spring (not shown and described later) included in the motion capture mechanism 63 is compressed by the stroke amount, on the basis of the stroke signal.

Figure 2:
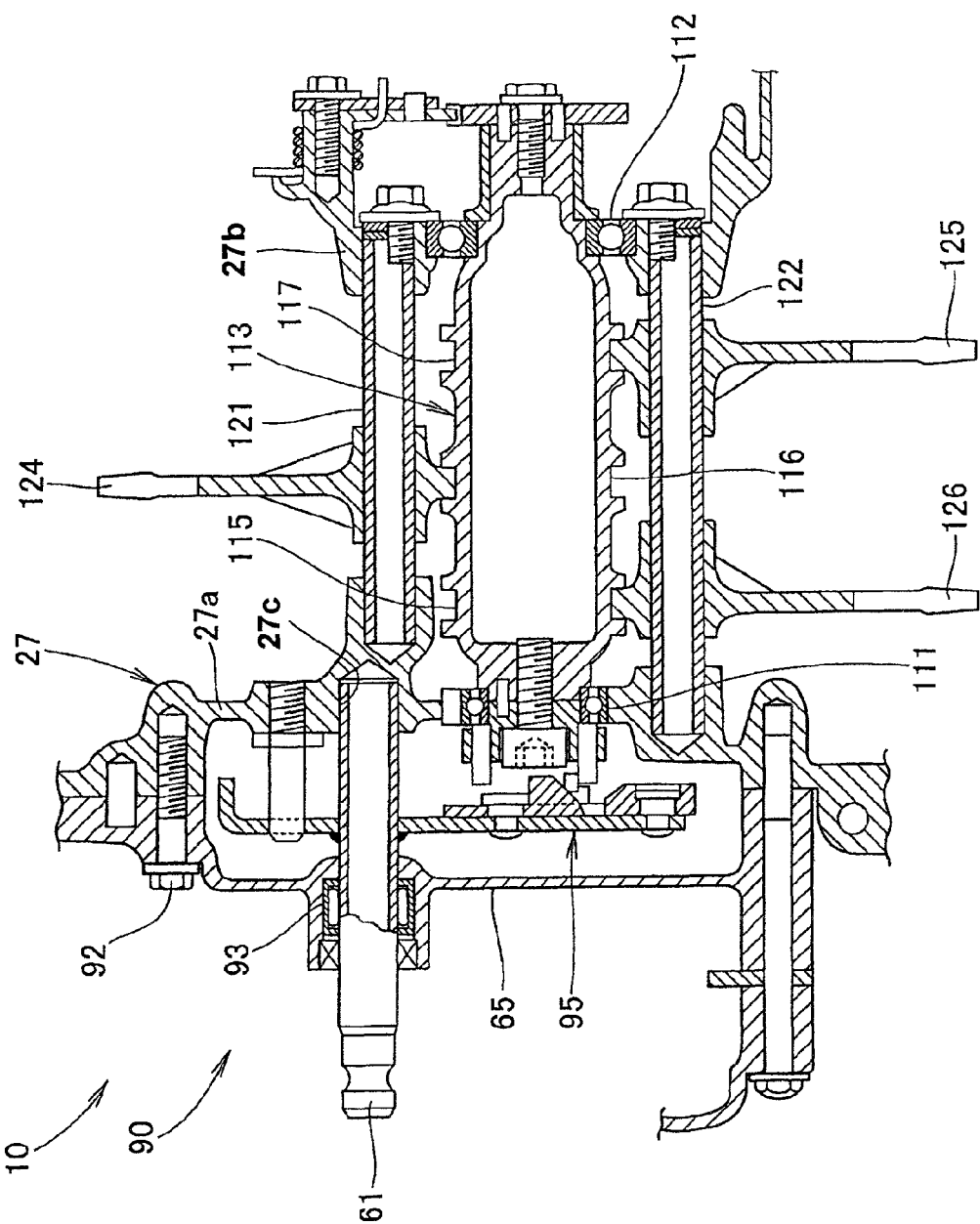
FIG. 2 is a first cross-sectional view illustrating an essential portion of the shifting system according to the present invention.

FIG. 2 is a first cross-sectional view illustrating an essential portion of the shifting system according to the present invention.

The shifting system 10 is provided with a shift operation mechanism 90 which selectively establishes the meshing engagement of a predetermined gear of the gears for a plurality of gear steps.

The shift operation mechanism 90 includes the spindle cover 65, the shift spindle 61, a shift drum 113, and shift forks 124, 125 and 126. The spindle cover 65 is attached to a left lateral wall 27a constituting portion of the crankcase 27 with a plurality of bolts 92. The shift spindle 61 is turnably attached to the spindle cover 65 via a needle bearing 93 and has a leading end portion turnably inserted into a lateral hole 27c formed in the left lateral wall 27a of the crankcase 27.

The shift drum 113 is connected to the shift spindle 61 via a shift mechanism 95 and turnably mounted to the crankcase 27 (specifically, the left lateral wall 27a and a middle wall 27b of the crankcase) via bearings 111, 112. The shift forks 124, 125 and 126 are inserted at their ends into a plurality of annular grooves 115, 116 and 117, respectively, formed on the outer circumferential surface of the shift drum 113.

In addition, the shift fork 124 is turnably and slidably mounted on a shift shaft 121; and the shift forks 125, 126 are turnably and slidably mounted on a shift shaft 122.

Figure 3:
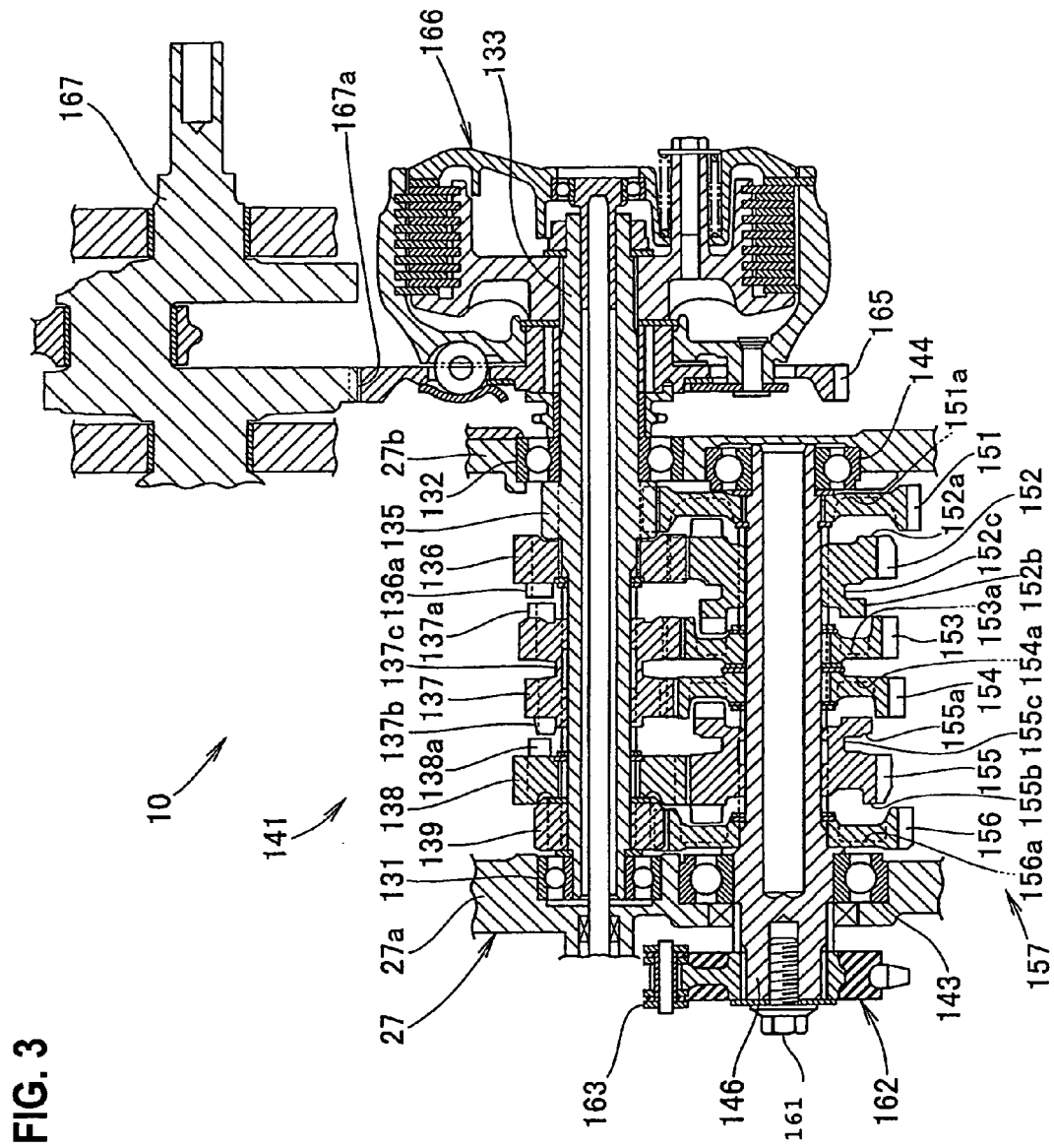
FIG. 3 is a second cross-sectional view illustrating an essential portion of the shifting system according to the present invention.

FIG. 3 is a second sectional view illustrating an essential portion of the shifting system according to the present invention.

The shifting system 10 includes a main shaft 133, a gear 141, a countershaft 146, a gear 157, and a drive sprocket 162. The main shaft 133 is rotatably supported by the left lateral wall 27a and middle wall 27b of the crankcase 27 via bearings 131, 132. The gear 141 includes a plurality of main shaft gears 135 through 139 provided on the main shaft 133. The countershaft 146 is rotatably supported by the left lateral wall 27a and middle wall 27b of the crankcase 27 via bearings 143, 144.

The gear 157 includes countershaft gears 151 through 156 provided on the countershaft 146 so as to mesh respectively with the main shaft gears 135 through 139 (the main shaft gear 137 is meshed with both the countershaft gears 153, 154). The drive sprocket 162 is spline-connected to and secured to the end of the countershaft 146 with a bolt 161. A chain 163 is wound around the drive sprocket 162 to transmit power to a rear wheel.

The main shaft 133 is attached at one end portion with a driven gear 165 and with a multiple-disk clutch 166. The driven gear 165 is meshed with a drive gear 167a formed on a crankshaft 167. The crankshaft 167 is rotated to rotate the driven gear 165. The rotation of the driven gear 165 is transmitted to the main shaft 133 via the multiple-disk clutch 166.

Of the main shaft gears 135 through 139, the main shaft gears 136, 137 and 138 are provided on lateral surfaces with a plurality of projections 136a; 137a and 137b; and 138a, respectively, each constituting a dog clutch. The main shaft gear 137 is spline-connected to the main shaft 133 in an axially moveable manner and formed with a fork insertion groove 137c into which the end of the shift fork 124 (see FIG. 3) is inserted.

In other words, the shift fork 124 is axially moved to axially move the main shaft gear 137 so that the projection 137a is fitted into a recess (a portion forming the dog clutch) between the projections 136a of the main shaft gear 136. Otherwise, the projection 137b is fitted into a recess (a portion forming the dog clutch) between the projections 138a of the main shaft gear 138.

Of the countershaft gears 151 through 156, the countershaft gears 152, 155 are provided on lateral surfaces with a plurality of projections 152a, 152b; and 155a, 155b, respectively, each constituting a dog clutch. The countershaft gears 151, 153, 154 and 156 are provided on lateral surfaces with a plurality of recesses 151a, 153a, 154a and 156a, respectively, each constituting a dog clutch.

The countershaft gear 152 is spline-connected to the countershaft 146 and formed with a fork insertion groove 152c into which the end of the shift fork 125 (see FIG. 3) is inserted.

In other words, the shift fork 125 is axially moved to axially move the countershaft gear 152 so that the projection 152a is fitted into the recess 151a of the countershaft gear 151. Otherwise, the projection 152b is fitted into the recess 153a of the countershaft gear 153.

The countershaft gear 155 is spline-connected to the countershaft 146 and formed with a fork insertion groove 155c into which the end of the shift fork 126 (see FIG. 3) is inserted.

In other words, the shift fork 126 is axially moved to axially move the countershaft gear 155 so that the projection 155a is fitted into the recess 154a of the countershaft gear 154. Otherwise, the projection 155b is fitted to the recess 156a of the countershaft gear 156.

Figure 4:
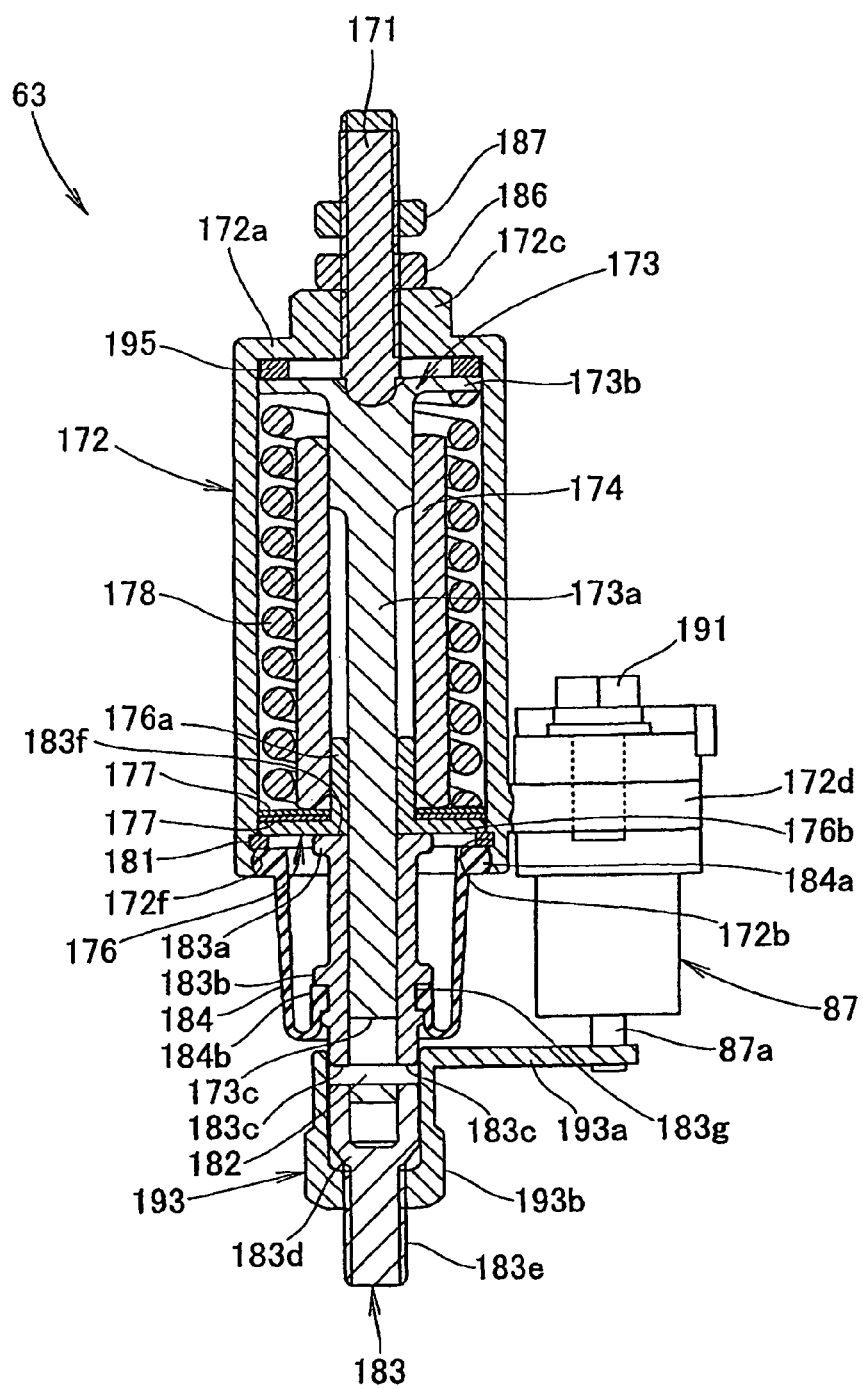
FIG. 4 is a cross-sectional view illustrating a motion capture mechanism according to the present invention.

FIG. 4 is a cross-sectional view of the motion capture mechanism 63 according to the present invention.

The motion capture mechanism 63 includes an adjusting bolt 171, a bottomed cylindrical case 172, a pull rod 173, a collar 174, a spring-receiving member 176, a plurality of shims 177, a compressive coil spring 178, a locking ring 181, a push-pull rod 183, and a rubber boot 184. The adjusting bolt 171 is screw-connected to the upper connection link 73a (see FIG. 1) at one end portion.

The bottomed cylindrical case 172 is screw-connected to the other end of the adjusting bolt 171 at a bottom portion 172a. The pull rod 173 is moveably inserted into the case 172. The collar 174 is fitted to the pull rod 173. The spring-receiving member 176 is moveably fitted into a small-diameter portion 173a of the pull rod 173.

The shims 177 are abutted against the spring-receiving member 176. The compressive coil spring 178 is provided between the shims 177 and a flange 173b provided at one end of the pull rod 173. The locking ring 181 is attached to an annular groove 172b provided on the inner surface of the case 172 close to the opening portion thereof for preventing the spring-receiving member 176 from disconnecting away from the case 172.

The push-pull rod 183 is moveably fitted to an end portion of the small-diameter portion 173a of the pull rod 173, abutted against the spring-receiving member 176 at one end, and further connected to the pull rod 173 with a pin 182. The rubber boot 184 is provided between the opening edge of the case 172 and the push-pull rod 183 to cover the opening of the case 172.

The adjusting bolt 171 is a part used to adjust the full length of the motion capture mechanism 63. This can facilitate assembly of the motion capture mechanism 63 to link mechanisms of different types of vehicles to enhance general versatility. The motion capture mechanism 63 includes lock nuts 186, 187.

The case 172 is integrally formed at the bottom portion 172a with a hexagonal portion 172c having a hexagonal column-like contour. In addition, the case 172 is integrally formed with a laterally projecting portion 172d on the outer circumferential surface. The stroke sensor 87 is mounted on the laterally projecting portion 172d with two bolts 191, 191 (only one is shown in FIG. 4).

The stroke sensor 87 includes a detection element 87a having an end portion thereof attached to a detection piece 193a of a stroke detection member 193 attached to the push-pull rod 183. The stroke sensor 87 is configured to detect the axial stroke amount of the push-pull rod 183 based on the displacement of the detection element 87a.

The pull rod 173 is formed with an elongated hole 173c at an end portion of the small-diameter portion 173a thereof. A pin 182 attached to the push-pull rod 183 is inserted into the elongate hole 173c.

Thus, the push-pull rod 183 can axially be movable by the vertical length of the elongated hole 173c with respect to the pull rod 173. A washer 195 is provided between the bottom portion 172a of the case 172 and the flange 173b of the pull rod 173.

The spring-receiving member 176 includes a cylindrical portion 176a fitted to the small-diameter portion 173a of the pull rod 173 and a flange 176b formed integrally with the end portion of the cylinder portion 176a. The shims 177, 177 are disposed between the flange 176b and the compressive coil spring 178.

By changing the number of the shims 177, the shims 177 can change the set-length of the compressive coil spring 178 and adjust the set-load of the compressive coil spring 178.

As discussed above, adjusting the set-load can adjust an operational feeling encountered when the change pedal 56 (see FIG. 1) is operated.

The set-load discussed above can be changed also by changing the spring constant of the compressive coil spring 178.

The push-pull rod 183 is a bottomed cylindrical member and is formed on the outer circumferential portion with an end large-diameter portion 183a and with an intermediate large-diameter portion 183b. In addition, the push-pull rod 183 is bored with pin insertion holes 183c, 183c, and is formed integrally with an external thread 183e at a bottom portion 183d.

An end face 183f of the end large-diameter portion 183a is abutted against the spring-receiving member 176. The intermediate large-diameter portion 183b is formed with an intermediate annular groove 183g. A pin 182 is press fitted into the pin insertion holes 183c, 183c. A cylindrical portion 193b of the stroke detection member 193 is screw-connected at an end portion to the external thread 183e.

The rubber boot 184 has a cylindrical shape, and is formed with an annular thick portion 184a at one end and fitted to an annular groove 172f formed at the opening portion of the case 172. The other end of the rubber boot 184 is formed to extend inwardly, and formed with a thick portion 184b at the tip thereof. The thick portion 184b is fitted into an intermediate annular groove 183g of the push-pull rod 183.

An operation of the motion capture mechanism 63 is described below.

Figures 5A, 5B:
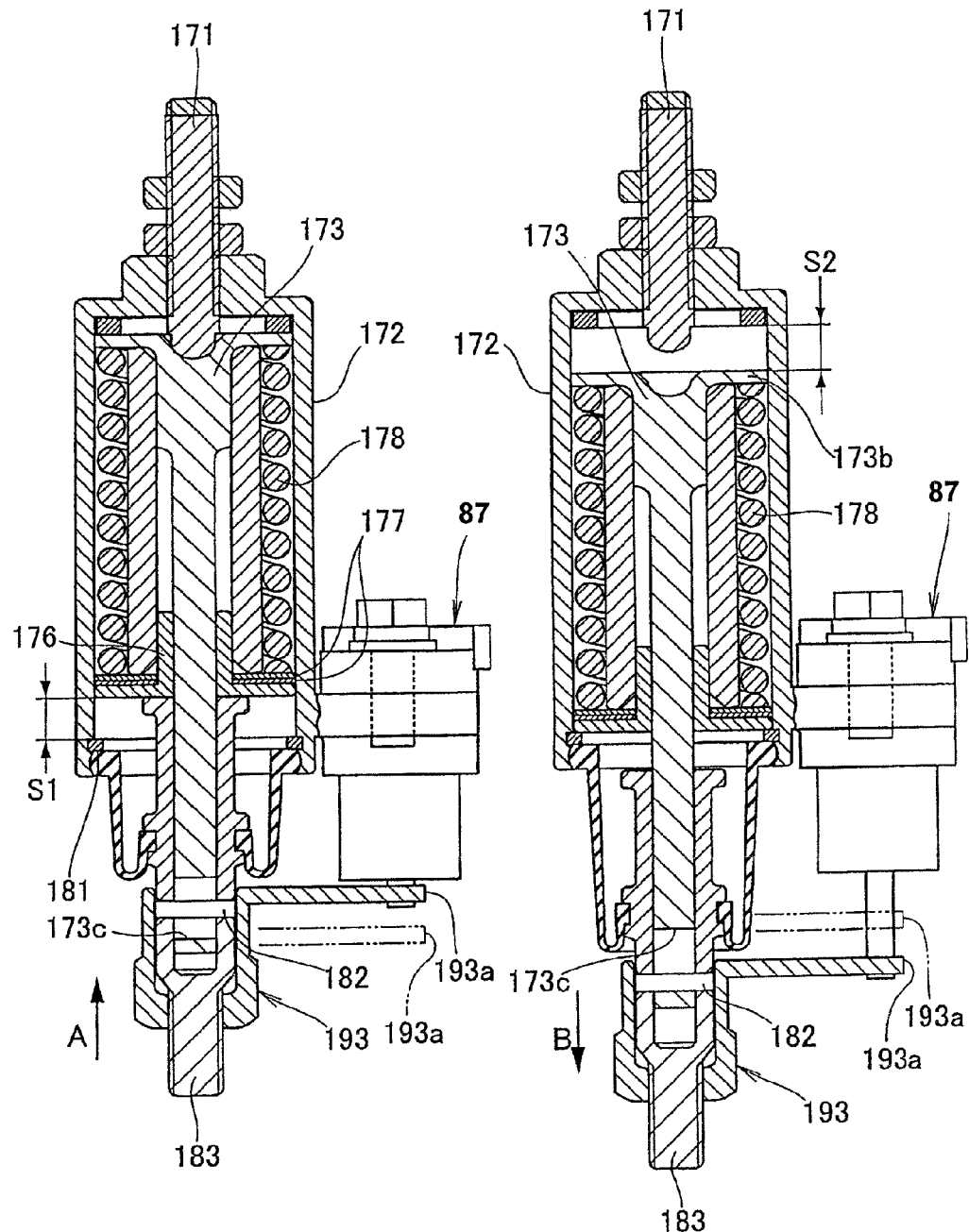
FIG. 5A is an operation diagram (gear-upshifting operation) illustrating the operation of the motion capture mechanism according to the present invention.
FIG. 5B is an operation diagram (gear-downshifting operation) illustrating the operation of the motion capture mechanism according to the present invention.

FIGS. 5A and 5B are operation diagrams illustrating the operation of the motion capture mechanism according to the present invention.

As shown in FIG. 5A, when the gear is upshifted (i.e., the end portion of the change pedal 56 (see FIG. 1) is pulled up by an instep), the push-pull rod 183 is pushed up toward the case 172 as indicated by arrow A.

Accordingly, the push-pull rod 183 pushes the lower end of the compressive coil spring 178 via the spring-receiving member 176 and shims 177, 177 to compress the compressive coil spring 178. The spring-receiving member 176 abutted against the end face of the locking ring 181 is displaced upward by a stroke amount S1. This stroke amount S1 is detected by a stroke sensor 87 via the push-pull rod 183 and then via the stroke detection member 193.

In this case, as the push-pull rod 183 is lifted, the pin 182 is moved upward from the lower end of the elongate hole 173c. Thus, the push-pull rod 183 can be moved with pull rod 173 allowed to rest.

As shown in FIG. 5B, when the gear is downshifted (i.e., the end of the change pedal 56 (see FIG. 1) is depressed by a bottom of operator's foot), the push-pull rod 183 is pushed downward so to be spaced away from the case 172.

Accordingly, the push-pull rod 183 pulls the pull rod 173 downward via the pin 182 located at the lower end of the elongate hole 173c so that the flange 173b of the pull rod 173 compresses the upper end of the compressive coil spring 178. Thus, the flange 173b is displaced downward by a stroke amount S2. The stroke amount S2 is detected by the stroke sensor 87 via the push-pull rod 183 and then via the stroke detection member 193.

As shown in FIGS. 1 through 3, the shifting system 10 is configured such that the shift spindle 61 is turned to allow the shift drum 113 interlocked therewith to selectively establish the meshing engagement of a predetermined gear of the gears for the plurality of speed steps via the shift forks 124, 125 and 126.

In the shifting system 10, the shift link mechanism 62, as a transmission mechanism for transmitting the operational force of shift operation, is disposed between the change pedal 56, as shift operation unit, operated by a shifting movement and the shift spindle 61. In addition, the motion capture mechanism 63 for transmitting the operational force via the compressive coil spring 178 as an resilient member is provided on the shift link mechanism 62.

When the change pedal 56 is operated by a shifting movement, the operational force of shift operation is transmitted to and turns the shift spindle 61 via the motion capture mechanism 63 on the shift link mechanism 62. The shift drum 113 is interlocked with the turning of the shift spindle 61 to establish the meshing engagement of a predetermined gear via the shift forks 124, 125 and 126 for shifting.

In this case, the projection of the dog clutch provided on one of the gears constituting a predetermined gear may not be meshed with the recess of the other gear but may be struck against a portion other than the recess. In such a case, along with the operation of the change pedal 56, the motion capture mechanism 63 loses (wastes, disables, or absorbs) shift operation. Therefore, the shift operation can be done without a sense of discomfort. When the striking or dog-abutment is eliminated, the biasing force stored by the compressive coil spring 178 can ensure the establishment of the meshing engagement of the gear.

Thus, while the operating feeling during shifting is improved by the motion capture mechanism 63, the shifting can be ensured.

Additionally, the motion capture mechanism 63 is provided on the shift link mechanism 62 between the shift spindle 61 and the change pedal 56. Therefore, it is not necessary to especially add one or more components to the periphery of the shift drum 113 of the shifting system 10. In addition, the motion capture mechanism 63 can easily be mounted to and dismounted from the shift link mechanism 62.

Thus, in the types of vehicles in which the shifting system 10 is not provided with the motion capture mechanism 63 but a transmission mechanism is provided between the shift spindle 61 and the change pedal 56, the motion capture mechanism 63 can easily be assembled on the transmission mechanism.

With the configuration as above, the number of assembly man-hours can be reduced without an influence on the design of the peripheries of the shift drum 113. In addition, the motion capture mechanism 63 can easily be assembled on a vehicle of type not originally provided therewith. In other words, the general versatility of the motion capture mechanism 63 can be enhanced.

The transmission mechanism is the shift link mechanism 62. The shift link mechanism 62 is provided with the upper link 73 as a linearly movable member which linearly moves. The motion capture mechanism 63 is attached to the upper link 73. The motion capture mechanism 63 can be assembled on the shift link mechanism 62 only by connecting both the ends of the motion capture mechanism 63 with the shift link mechanism 62. Thus, the motion capture mechanism 63 can easily be assembled to the upper link 73.

Further, since the shift operation unit is the shift pedal 56 operated by an operator, the operational feeling of the change pedal 56 can be enhanced by the motion capture mechanism 63.

As shown in FIG. 5, the compressive coil spring 178 is structured to act in the compressive direction during upshifting and downshifting operations. Therefore, it is not necessary to secure to the compressive coil spring 178 a member for transmitting operational force to the compressive coil spring 178 and a member for receiving operational force from the compressive coil spring 178. This eliminates a complicated structure. Specifically, it is only needed to bring the flange 173b of the pull rod 173 and the shims 177 into abutment against both the ends of the compressive coil spring 178. Thus, the motion capture mechanism 63 can be reduced in the number of component parts and in size.

As shown in FIGS. 3 and 4, the stroke sensor 87 is provided to serve as a stroke detection unit for detecting an amount of motion received by the motion capture mechanism 63 during operation thereof. Thus, the stroke can easily be detected by the stroke sensor 87 which detects the amount of motion (stroke) received by the motion capture mechanism 63.

As shown in FIGS. 1 and 4, the motion capture mechanism 63 includes the case 172, the pull rod 173, the spring-receiving member 176, the compressive coil spring 178, and the push-pull rod 183. The case 172 is connected at one end with the shift link mechanism 62 for one of the change pedal 56 and the shift spindle 61, specifically, with the upper connection link 73a of the upper link 73 via the adjusting bolt 171.

The push-pull rod 173 has one end thereof inserted into the case 172. The spring-receiving member 176 is movably inserted into the case 172 and is restricted by the other end side of the case 172 to be displaced. The compressive coil spring 178 is disposed between one end (specifically, the flange 173b) of the pull rod 173 and the spring-receiving member 176 (specifically, the flange 176b). Specifically, the shims 177, 177 are interposed between the flange 176b and the compressive coil spring 178.

The push-pull rod 183 is attached to the other end of the pull rod 173 so as to be axially movable in a predetermined range (movable in the range of the length of the elongate hole 173c) and can push the spring-receiving member 176. In addition, the push-pull rod 183 is linked to the shift link mechanism 62 for the other of the change pedal 56 and the shift spindle 61, specifically, to the lower connection link 73b of the upper link 73.

For example, when the gear is upshifted, the push-pull rod 183 is pushed into toward the case 172 in order to enable the compression of the compressive coil spring 178 via the spring-receiving member 176 while the case 172 is brought into the stationary state.

When the gear is downshifted, the pull rod 173 is pulled out from the side of the case 172 via the push-pull rod 183. Thus, it is possible for one end of the pull rod 173 to compress the compressive coil spring 178 when the case 172 is brought into the stationary state. This can configure the motion capture mechanism 63 with a simple structure, which can reduce the cost of the shifting system 10.

The stroke detection unit is the stroke sensor 87. In addition, the ECU 86 (see FIG. 1) is provided as the computing unit for computing the shift operation load based on the detection value of the stroke sensor 87. The stroke sensor 87 detects a stroke amount and the ECU 86 calculates the shift operation load based on the detection value of the stroke amount. Thus, the partial function of the motion capture mechanism 63 can be used to determine a shift load. That is to say, it is not necessary to provide an additional load sensor, which can reduce costs.

Further, since the shifting system 10 is provided for the motorcycle 1, the provision of the motion capture mechanism 63 can improve the operational feeling encountered when during operation of the motorcycle 1, an operator operates shifting system.

The motion capture mechanism 63 can easily be assembled from the outside of the shifting system even to the motorcycle not provided with the motion capture mechanism in the shifting system 10. Therefore, the general versatility of the motion capture mechanism 63 can be enhanced. In addition, the assembly man-hours of the shifting system 10 of the motorcycle 1 can be reduced even if the motion capture mechanism 63 is provided.

Figure 6:
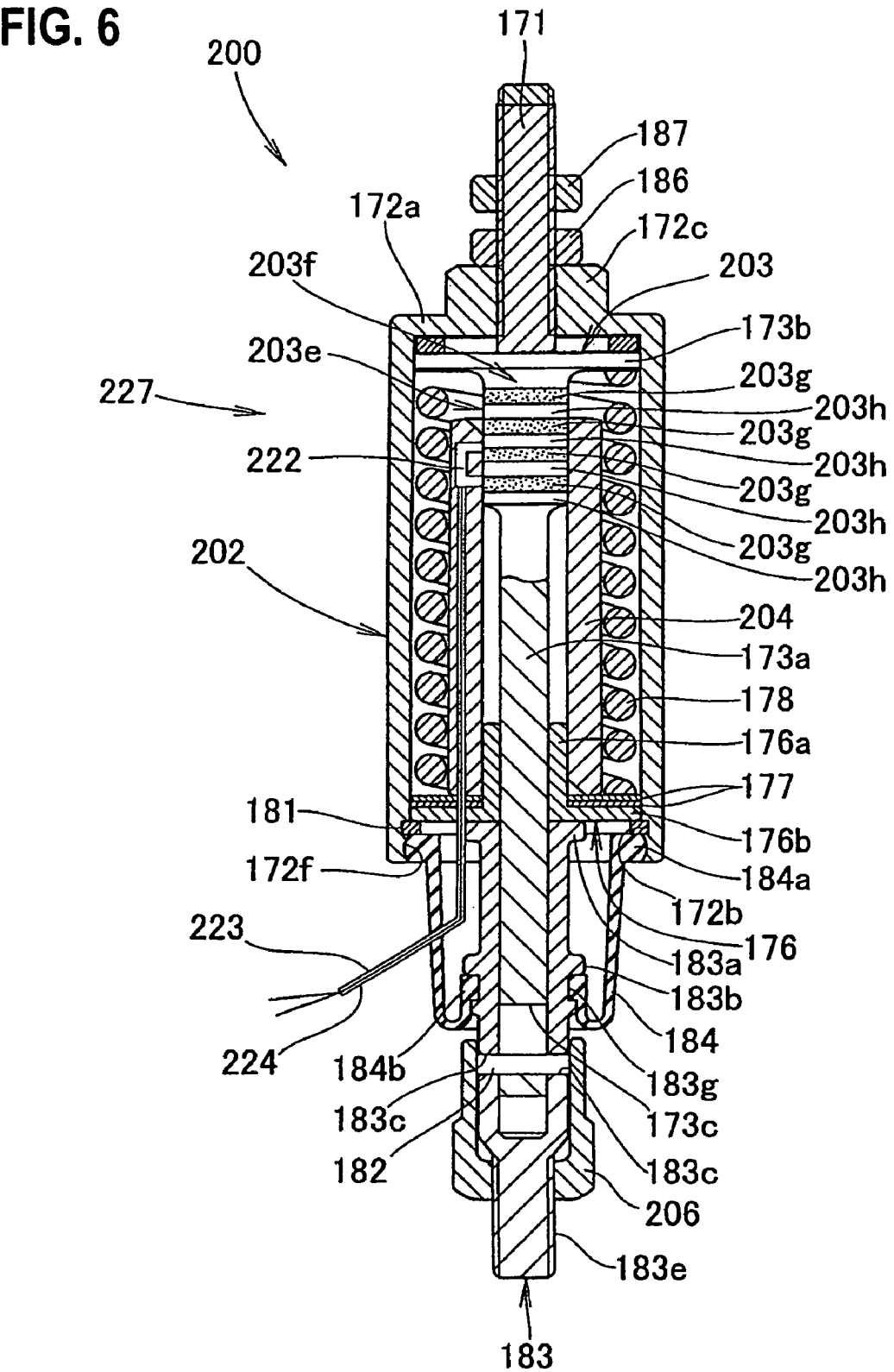
FIG. 6 is a cross-sectional view illustrating another embodiment of the motion capture mechanism according to the present invention

FIG. 6 is a cross-sectional view illustrating another embodiment of a motion capture mechanism according to the present invention. The same configurations as those of the embodiment shown in FIG. 4 are denoted with like reference numerals and their detailed explanations are omitted.

A motion capture mechanism 200 includes an adjusting bolt 171, a bottomed cylindrical case 202 screw-connected at a bottom portion 172a to the other end of the adjusting bolt 171, a pull rod 203 movably inserted into the case 202, a collar 204 fitted to the pull rod 203, a spring-receiving member 176, a plurality of shims 177, a compressive coil spring 178, a locking ring 181, a pin 182, a push-pull rod 183, and a rubber boot 184.

The motion capture mechanism 200 further includes a pin-retaining member 206 attached to the push-pull rod 183 to retain the pin 182; a magnetic sensor 222 provided in the collar 204 to detect a to-be-detected portion 203f provided in a large-diameter portion 203e of the pull rod 203; and output electric leads 223, 224 used to take a signal from the magnetic sensor 222 to the outside.

The to-be-detected portion 203f of the pull rod 203 is a portion in which a plurality of nonmagnetic layers 203g are arranged axially alternately with magnetic layers 203h in a large-diameter portion 203e made of a magnetic member. When the pull rod 203 is moved downward relative to the magnetic sensor 222 provided in the collar 204, the magnetic sensor 222 can detect the stroke amount of the pull rod 203.

When the spring-receiving member 176 is moved upward, the collar 204 is moved upward relative to the pull rod 203 via the shims 177 so that the stroke amount of the spring-receiving member 176 can be detected.

The to-be-detected portion 203f and magnetic sensor 222, as discussed above, includes the stroke sensor 227.

As shown in FIG. 1, the motion capture mechanism 63 is provided on the upper link 73 of the shift link mechanism 62 in the present embodiment. However, the present invention is not limited to the embodiment. The motion capture mechanism 63 may be provided on the lower link 82 of the shift link mechanism 62.

The shift pedal is described as the shift operation unit. However, the shift operation unit may be a shift actuator (a motor).

INDUSTRIAL APPLICABILITY

The shifting system of the present invention is suitable for motorcycles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A shifting system in which a shift spindle is turned for allowing a shift drum interlocked therewith for selectively establishing meshing engagement of a predetermined gear among a plurality of gears for a plurality of gear steps via a shift fork, said shifting system comprising:
   a transmission mechanism provided between a shift operation unit operated by a shifting instruction and the shift spindle so as to transmit an operational force of the shift operation unit to the shift spindle; and
   a motion capture mechanism comprising a resilient member, wherein the motion capture mechanism is provided with a stroke detection unit for detecting a shift operation amount received by the motion capture mechanism during operation thereof;
   said motion capture mechanism being provided on the transmission mechanism for transmitting the operational force of the shift operation unit to the shift spindle via said resilient member.

2. The shifting system according to claim 1, wherein the transmission mechanism is a link mechanism comprising a linearly movable member, and wherein said motion capture mechanism is provided in the linearly movable member.

3. The shifting system according to claim 2, wherein the shift operation unit comprises a change pedal, which is operated by an operator, during operation of a motorcycle.

4. The shifting system according to claim 2, wherein the elastic member is operated such that said elastic member moves in a compressive direction thereof during both upshift and downshift gear operation.

5. The shifting system according to claim 4, wherein the motion capture mechanism includes:
   a case linked at one end thereof with said transmission mechanism at one of the shift operation unit and the shift spindle;
   a pull rod having one end thereof inserted into the case;
   a spring-receiving member movably inserted into the case, wherein displacement of said spring-receiving member is restricted by the other end of the case;
   said resilient member disposed between one end of the pull rod and the spring-receiving member; and
   a push-pull rod attached to the other end of the pull rod so as to be axially movable in a predetermined range and to be operable to push the spring-receiving member, and linked with the transmission mechanism at the other of the shift operation unit and the shift spindle.

6. The shifting system according to claim 2, wherein the motion capture mechanism includes:
   a case linked at one end thereof with said transmission mechanism at one of the shift operation unit and the shift spindle;
   a pull rod having one end thereof inserted into the case;
   a spring-receiving member movably inserted into the case, wherein displacement of said spring-receiving member is restricted by the other end of the case;
   said resilient member disposed between one end of the pull rod and the spring-receiving member; and
   a push-pull rod attached to the other end of the pull rod so as to be axially movable in a predetermined range and to be operable to push the spring-receiving member, and linked with the transmission mechanism at the other of the shift operation unit and the shift spindle.

7. The shifting system according to claim 2, further comprising a computing unit; wherein the stroke detection unit is a stroke sensor; and said computing unit is operable to compute a shift operation load based on a value detected by the stroke sensor.

8. The shifting system according to claim 1, wherein said shift operation unit comprises a change pedal, which is operated by an operator, during operation of a motorcycle.

9. The shifting system according to claim 8, wherein the resilient member is operated such that said resilient member moves in a compressive direction thereof during both upshift and downshift gear operation.

10. The shifting system according to claim 8, wherein the motion capture mechanism includes:
    a case linked at one end thereof with said transmission mechanism at one of the shift operation unit and the shift spindle;
    a pull rod having one end thereof inserted into the case;
    a spring-receiving member movably inserted into the case, wherein displacement of said spring-receiving member is restricted by the other end of the case;
    said resilient member disposed between one end of the pull rod and the spring-receiving member; and
    a push-pull rod attached to the other end of the pull rod so as to be axially movable in a predetermined range and to be operable to push the spring-receiving member, and linked with the transmission mechanism at the other of the shift operation unit and the shift spindle.

11. The shifting system according to claim 1, wherein the motion capture mechanism includes:
    a case linked at one end thereof with said transmission mechanism at one of the shift operation unit and the shift spindle;
    a pull rod having one end thereof inserted into the case;
    a spring-receiving member movably inserted into the case, wherein displacement of said spring-receiving member is restricted by the other end of the case;

said resilient member disposed between one end of the pull rod and the spring-receiving member; and a push-pull rod attached to the other end of the pull rod so as to be axially movable in a predetermined range and to be operable to push the spring-receiving member, and linked with the transmission mechanism at the other of the shift operation unit and the shift spindle.

12. The shifting system according to claim 1, wherein the motion capture mechanism includes:

a case linked at one end thereof with said transmission mechanism at one of the shift operation unit and the shift spindle;

a pull rod having one end thereof inserted into the case;

a spring-receiving member movably inserted into the case, wherein displacement of said spring-receiving member is restricted by the other end of the case;

said resilient member disposed between one end of the pull rod and the spring-receiving member; and a push-pull rod attached to the other end of the pull rod so as to be axially movable in a predetermined range and to be operable to push the spring-receiving member, and linked with the transmission mechanism at the other of the shift operation unit and the shift spindle.

13. The shifting system according to claim 1, further comprising a computing unit; wherein the stroke detection unit is a stroke sensor; and said computing unit is operable to compute a shift operation load based on a value detected by the stroke sensor.

14. A motorcycle comprising the shifting system in which a shift spindle is turned for allowing a shift drum interlocked with the turning of the shift spindle for selectively establishing meshing engagement of a predetermined gear among a plurality of gears for a plurality of gear steps via a shift fork, said shifting system comprising:

a transmission mechanism provided between a shift operation unit operated by a shifting instruction and the shift spindle so as to transmit an operational force of the shift operation unit to the shift spindle; and a motion capture mechanism comprising a resilient member, wherein the motion capture mechanism is provided with a stroke detection unit for detecting a shift operation amount received by the motion capture mechanism during operation thereof; said motion capture mechanism being provided on the transmission mechanism for transmitting the operational force of the shift operation unit to the shift spindle via said resilient member.

15. A motorcycle comprising a shifting system in which a shift spindle is turned for allowing a shift drum interlocked with the turning of the shift spindle for selectively establishing meshing engagement of a predetermined gear among a plurality of gears for a plurality of gear steps via a shift fork, said shifting system comprising:

a transmission mechanism provided between a shift operation unit operated by a shifting instruction and the shift spindle so as to transmit operational force of shift operation unit to the shift spindle; and a motion capture mechanism comprising a resilient member, wherein the motion capture mechanism is provided with a stroke detection unit for detecting a shift operation amount received by the motion capture mechanism during operation thereof; said motion capture mechanism being provided on the transmission mechanism for transmitting the operational force of the shift operation unit to the shift spindle via said resilient member;

wherein the transmission mechanism is a link mechanism comprising a linearly movable member, and wherein said motion capture mechanism is provided in the linearly movable member.

16. A motorcycle according to claim 15, wherein the motion capture mechanism includes:

a case linked at one end thereof with said transmission mechanism at one of the shift operation unit and the shift spindle;

a pull rod having one end thereof inserted into the case;

a spring-receiving member movably inserted into the case, wherein displacement of said spring-receiving member is restricted by the other end of the case;

said resilient member disposed between one end of the pull rod and the spring-receiving member; and a push-pull rod attached to the other end of the pull rod so as to be axially movable in a predetermined range and to be operable to push the spring-receiving member, and linked with the transmission mechanism at the other of the shift operation unit and the shift spindle.

* * * * *